(12) United States Patent
Zhadanov et al.

(10) Patent No.: US 9,393,578 B2
(45) Date of Patent: Jul. 19, 2016

(54) WATER SHOWER SYSTEM

(71) Applicants: Eli Zhadanov, Brooklyn, NY (US); Sam Zhadanov, Brooklyn, NY (US)

(72) Inventors: Eli Zhadanov, Brooklyn, NY (US); Sam Zhadanov, Brooklyn, NY (US)

(*) Notice: Subject to any disclaimer, the term of this patent is extended or adjusted under 35 U.S.C. 154(b) by 0 days.

(21) Appl. No.: 13/785,043

(22) Filed: Mar. 5, 2013

(65) Prior Publication Data
US 2014/0250586 A1    Sep. 11, 2014

(51) Int. Cl.
| A47K 3/00 | (2006.01) |
| B05B 1/16 | (2006.01) |
| F16K 11/048 | (2006.01) |
| E03C 1/02 | (2006.01) |
| E03C 1/04 | (2006.01) |
| E03C 1/06 | (2006.01) |
| B05B 1/18 | (2006.01) |

(52) U.S. Cl.
CPC . B05B 1/16 (2013.01); E03C 1/023 (2013.01); E03C 1/0408 (2013.01); E03C 1/06 (2013.01); F16K 11/048 (2013.01); B05B 1/18 (2013.01)

(58) Field of Classification Search
CPC ..................................... E03C 1/06; B05B 1/18
USPC ............................. 4/615, 567, 570, 675, 678
See application file for complete search history.

(56) References Cited

U.S. PATENT DOCUMENTS

| 3,471,872 A | * | 10/1969 | Symmons | 4/570 |
| 4,901,927 A | * | 2/1990 | Valdivia | 239/446 |
| 7,043,776 B1 | * | 5/2006 | Wu | 4/601 |
| 8,505,567 B1 | * | 8/2013 | Wu | 137/119.03 |
| 2007/0158460 A1 | * | 7/2007 | Lev | 239/132.1 |
| 2008/0169362 A1 | * | 7/2008 | Kwan et al. | 239/442 |

* cited by examiner

Primary Examiner — Huyen Le
(74) Attorney, Agent, or Firm — Henry M. Feiereisen LLC

(57) ABSTRACT

A water shower system has an overhead shower, a hand-held shower, a water distributing element connected to a source of water and also to the overhead shower and to the hand-held shower and having a valve located between the source of water and the overhead shower and the hand-held shower, and a switch located outside of the water distributing element and spaced from the water distributing element and the valve, operatable by a user and having a first position in which the valve provides a water supply to the hand-held shower so that water issues from the latter, and a second position in which the valve provides a water supply to the overhead shower so that water issues from the latter.

2 Claims, 4 Drawing Sheets

WATER SHOWER SYSTEM

BACKGROUND OF THE INVENTION

The present invention relates in general to water shower system. More particularly it relates to water shower systems, which have both overhead showerheads and hand-held showerheads.

Water system of the above mentioned general type are known in the art. In the known systems switches are used for redirecting water either to the overhead showerhead or to the hand-held shower head as desired by a user. Such switches are usually located at a substantial height above the head of the user who wants to take a shower. This makes it difficult to be reached by elderly people, disabled people, short people. It is therefore believed that the existing water systems of this type should be further improved.

SUMMARY OF THE INVENTION

Accordingly it is an object of the present invention to provide a water supply system, which is a further improvement of the existing systems.

In keeping with these objects and with others which will become apparent hereinafter, one feature of the present invention resides, briefly stated in a water shower system, which has an overhead shower; a hand-held shower; a water distributing element connected to a source of water and also to said overhead shower and to said hand-held shower and having a valve located between the source of water and overhead shower and said hand-held shower; and a switch located outside of said water distributing element with said valve and spaced from said water distributing element with said valve, operatable by a user and having a first position in which said valve provides a water supply to said hand-held shower so that water issues from said hand-held shower, and a second position in which said valve provides a water supply to said overhead shower so that water issues from said overhead shower.

When the water supply system is designed in accordance with the present invention, the switch can be located in the area of the hand-held shower, so that a user can operate the system and provide a desired water supply with the switch located at a low height, and it is no longer necessary to reach locations high above the user's head. As a result, the new system is very convenient in operation, especially for elderly people, disabled people sitting in wheelchairs, short people, etc. At the same time it provides various modes of operation as desired by a user.

In accordance with another feature of the present invention, said hand-held shower has a showerhead with a handle and a hose connecting said handle with said water distributing element, and wherein said switch can be located on said handle, or on said hose, or on a connecting member which connects said handle to said hose.

Still another feature of the present invention is that in the water shower system of the invention said overhead shower and said hand-held shower each have a showerhead, and wherein each of said showerheads of said different showers has at least two groups of openings providing issuance of water in at least two different patterns.

A further new feature of the present invention is that in the inventive water shower system said water distributing element has an inlet channel, a first outlet channel connected with said hand-held shower, and a second outlet channel connected with said overhead shower, said valve is located between said inlet channel and said outlet channels, and said inlet channel and said second outlet channel are coaxial with one another along an axis, while said first outlet channel extends substantially perpendicular to said axis.

In the water shower system said valve has a valve member moveable perpendicular to said axis. Also a restriction is provided between said inlet channel and said moveable valve member and restricting a water flow.

Still a further feature of the present invention is that said switch has a third position in which it is not fully closed, so that said valve provides issuance of water in a pulsating manner.

The novel features of the invention are set forth in particular in the appended claims. The invention itself, however, will be best understood from the following description of the preferred embodiments, which is accompanied by the following drawings.

DESCRIPTION OF THE PREFERRED EMBODIMENTS

Figure 1:
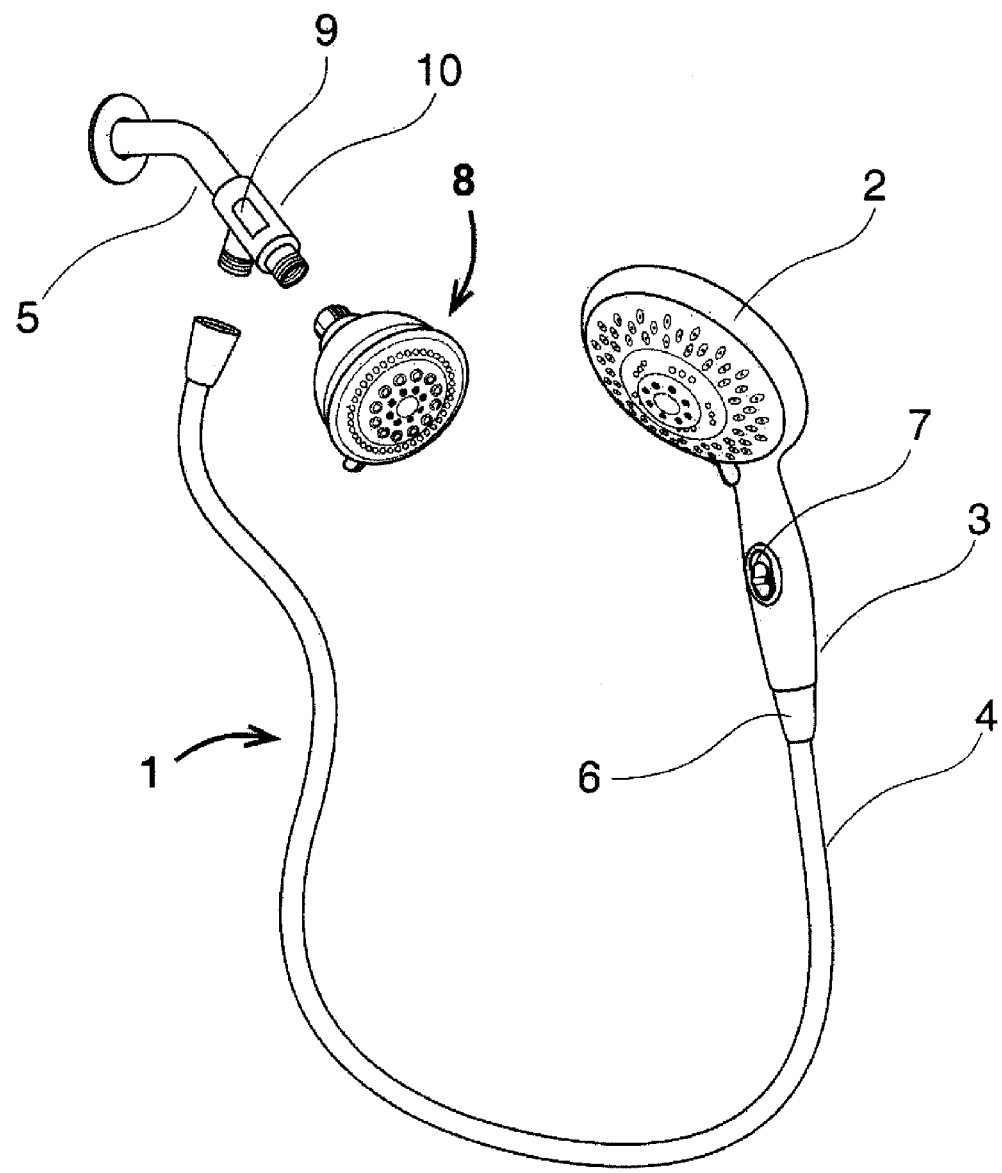
FIG. 1 is a view showing a water shower system in accordance with the present invention with a water distributing element, an overhead shower, a hand-held shower, and a switch for switching the operation of the system.

A water system in accordance with the present invention has a held-held shower 1 which includes a hand-held showerhead 2, a handle 3, and a hose 4 connected to the handle by a connecting member 6 and connectable to a water source 5, formed for example as a water pipe. The water supply system also has a switch 7 which is associated with the hand-held shower 1.

The water system further has an overhead shower with an overhead showerhead 8, and a valve 9 associated with a water distributing element 10. The valve 9 is located between the water source 5 and the hand-held shower 1. The hand-held shower and the overhead shower are connected with the water source 5 via the water distributing element 10. The switch 7 is located outside the water distributing element 10 and spaced away from the water distributing element 10 and the valve 9.

The water distributing element 10 has a housing 11 provided with channels including an inlet channel 12, a first outlet channel 13 and a second outlet channel 14 connected, for example by threads, to the water source 5, to the hand-held shower and to the overhead shower correspondingly. The inlet channel 12 is coaxial with the second outlet channel 14 connected to the overhead shower, along an axis, while the first outlet channel 13 connected to the hand-held shower extends substantially perpendicularly to this axis.

A restriction 15 is provided between the inlet channel 12 and a valve body of the valve 9 and restricts a water flow, and two washers 16 are arranged at its opposite sides. The valve 9 is located inside an intermediate space 17 of the housing 11 between the inlet channel 12 and the outlet channels 13 and 14. The valve has a body 18 with a valve element 19 having a V-shaped valve member 20 and a U-shaped valve member 21. The valve body has two grooves 22 with ring seals 23.

The valve body is cylindrical and its side walls 24 have four openings 25. In the upper area the valve body has a partition 26 with an opening 27 and four petals 28. The valve is fixed by a threaded bush 29 located in the outlet channel 13 and having an opening 30. Sealing rings 31 are provided for a leak-free water flow.

The switch 7 has at least two positions, including a first position which is an open position and a second position which is a closed position. The switch 7 can also have a third position which is a not fully Closed position.

Each of the showerheads of the overhead shower and the hand-held shower have at least two groups of outlet openings, which provide issuance of water in at least two different patterns. For example, for this purpose the openings of the different groups can differ from each other in their shape, size, location, etc.

Figures 2A, 2B:
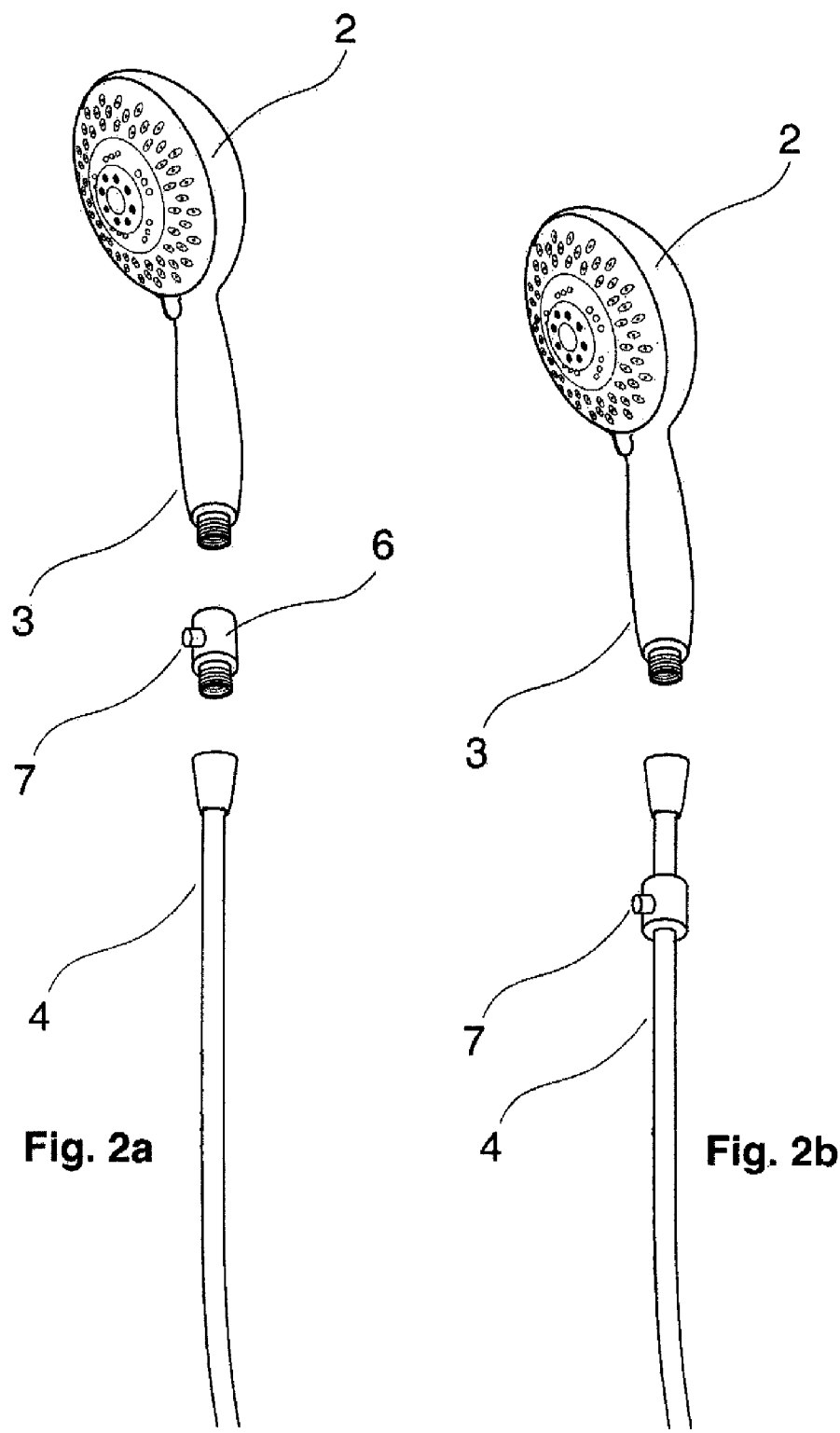
FIGS. 2A and 2B are views showing two other possible locations of the switch in the inventive water supply system.
Figure 3:
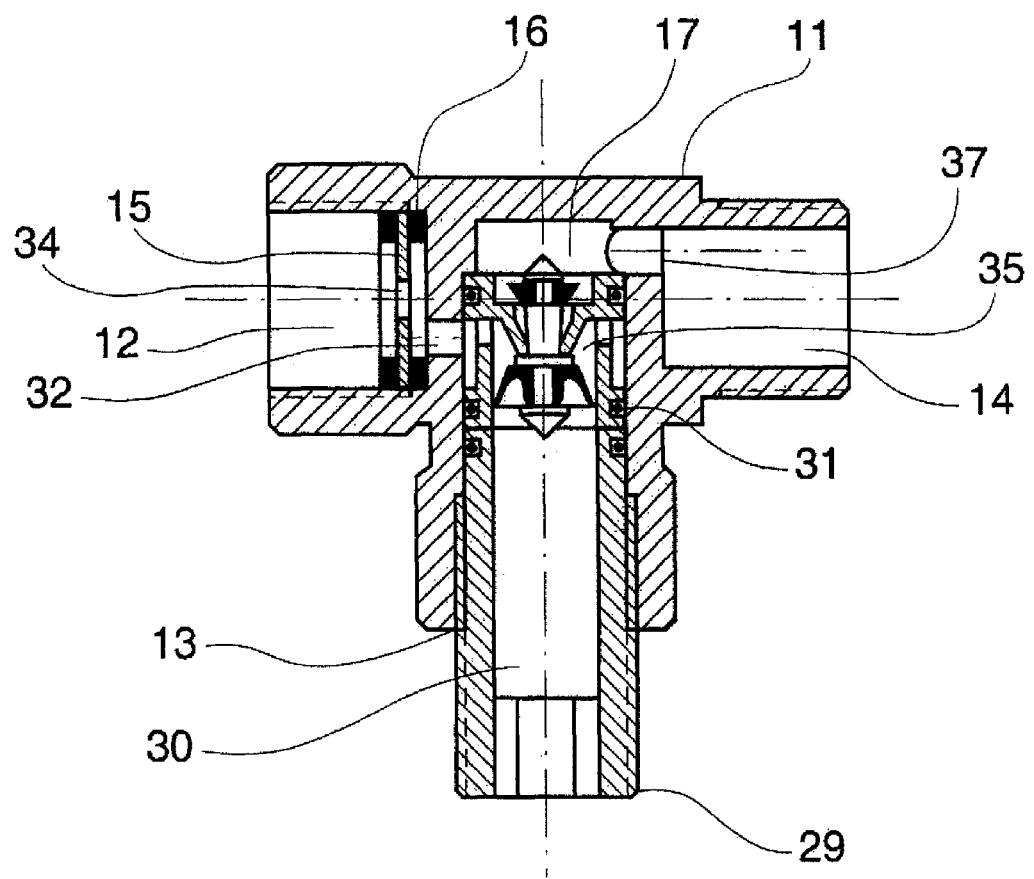
FIG. 3 is a view showing a cross section of the water distributing element provided with a valve which directs water in a corresponding direction.
Figure 4:
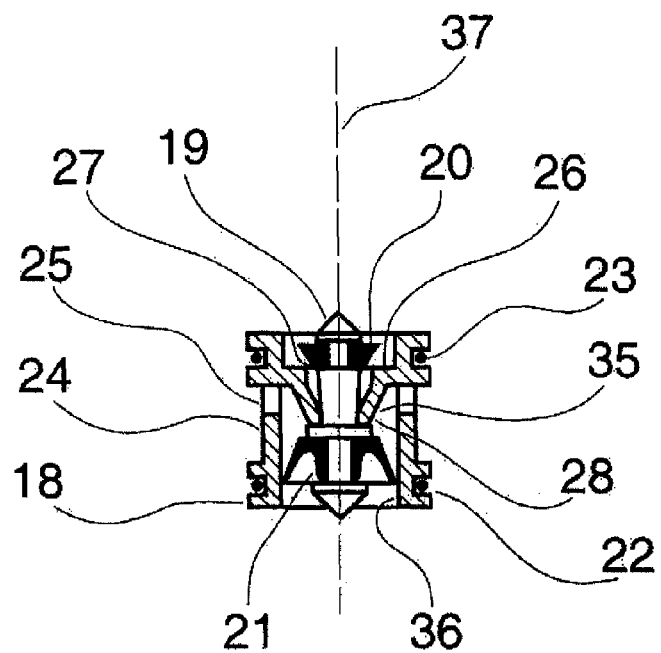
FIGS. 4 and 5 are views showing the valve of the water distributing element in two different positions during the operation of the system for water supply in accordance with the present invention.
Figure 5:
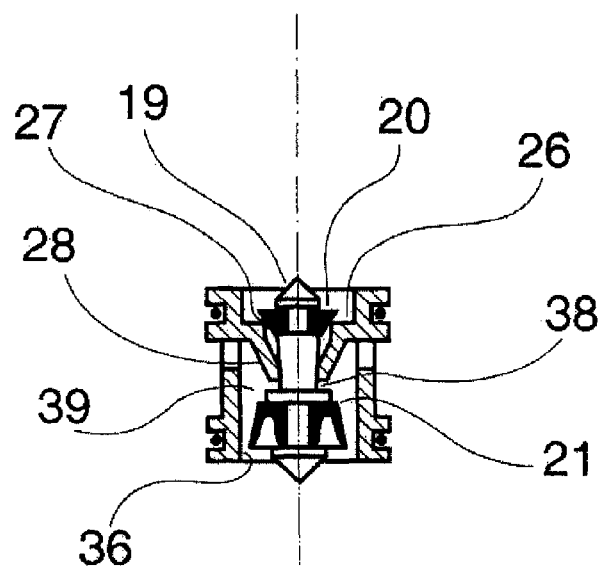

As can be seen from FIGS. 1, 2a and 2b, the switch 7 can be located either on the handle 3, or on the connecting member 6, or on the hose 4 of the hand-held shower.

The water shower system in accordance with the present invention as disclosed in detail hereinabove operates for showering of a user in the following manner.

When the switch 7 is moved by a user to an open position, water is supplied through the openings 34 and 32 in the housing 11 into the area 35 of the valve body 18. Under the action of water pressure on the valve member 21 the valve element 19 first moves along a vertical axis 37 downwardly and the valve member 20 closes the opening 27. Then the valve member 21 is compressed, and water forms a gap between the valve member 21 and the wall 36 and flows through the opening 30 to the hand-held shower and in particular to its showerhead 2.

The hand-held showerhead 2 is thereby operated and water issues through it outwardly for showering, as desired by a user. In this manner of operation the water flow to the overhead shower is blocked.

When the user moves the switch 7 to a closed position, a water pushes the valve element 19 upwardly and the valve member 20 opens the opening 27 causing water to flow through the opening 27 and through the channel 14 to the overhead showerhead 8. Thereby the overhead showerhead 8 is operated and water issues through it outwardly from it for showering as desired by a user. In this manner of operation the water flow to the hand-held shower is blocked.

In the shown embodiment, therefore when the switch 7 is in its first open position the valve 9 operates to supply water to the hand-held showerhead 2 and to block water supply to the overhead showerhead 8, while when the switch 7 is moved to its second closed position the valve 9 operates to supply water to the overhead showerhead 8 and to block water supply to the hand-held showerhead 2.

The switch 7 can be also moved by a user to a further position in which is it is not fully closed. In this case the valve element of the valve, under the action of water, periodically displaces along its axis up and down, and a pulsating flow of water issues from the overhead showerhead 8.

In the inventive water supply system the switch is conveniently located in the area of the hand-held shower at a lower height and can be easily reached by a user, and the system provides a water issuance either from the hand-held showerhead, or from the overhead showerhead, or in a pulsating manner.

The water shower system in accordance with the invention is not limited to the details shown since various structural changes are possible without departing from the spirit of the invention.

What is desired to be protected by Letters Patent is set in particular in the appended claims:

1. A water shower system, comprising an overhead shower with a showerhead; a hand-held shower with a showerhead; a water distributing element having a housing and connected to a source of water and also connected directly without intermediate elements to said overhead shower and connected indirectly via a hose and a handle to said hand-held shower and having a valve located between the source of water and said overhead shower; a switch located outside of said water distributing element on the handle of the showerhead of said hand-held shower or adjacent to said handle on the hose connecting said handle with said water distributing element and spaced from said water distributing element and said valve, operable by a user and having a first position in which a valve element of said valve is pushed by water downwardly and said valve provides a water supply to said hand-held shower so that water issues from the latter, and a second position in which a valve element of said valve is pushed by water upwardly and said valve provides a water supply to said overhead shower so that water issues from the latter, wherein said housing of said water distributing element has an inlet channel connectable to the water source, a first outlet channel connected with said hand-held shower, and a second outlet connected with said overhead shower, wherein said inlet channel and said outlet channels are coaxial, wherein said valve is movable substantially perpendicular to an axis of said inlet channel and said second outlet channel, wherein each of the showerheads of said hand-held shower and said overhead shower have at least two groups of openings providing issuance of water in at least two different patterns, wherein said switch is formed so that said first position is an open position of said switch, and said second position is a closed position of said switch, and said switch has a third position in which it is not fully closed and provides issuance of water in a pulsating manner; and a restriction which is separate from said housing of said water distributing element, said separate restriction having an opening and being arranged between said inlet channel of said housing and said valve and restricting a flow of water for the water supply to said hand-held shower when said switch spaced from said valve is in its first position and said valve provides the water supply to said hand-held shower, restricting a flow of water for the water supply to said overhead shower when said switch spaced from said valve is in its second position and said valve provides the water supply to said overhead shower, restricting a flow of water issuing from one of said groups of openings of each of the showerheads, restricting a flow of water issuing from the other group of the openings of each of the showerheads, and restricting the flow of water issuing in a pulsating manner in the third position of the switch.

2. A water shower system of claim 1, further comprising two washers arranged at two opposite axial sides of said restriction.

* * * * *